March 6, 1962     K. MAICHEN     3,023,644
INFINITELY VARIABLE FRICTION WHEEL GEAR
Filed Aug. 17, 1959
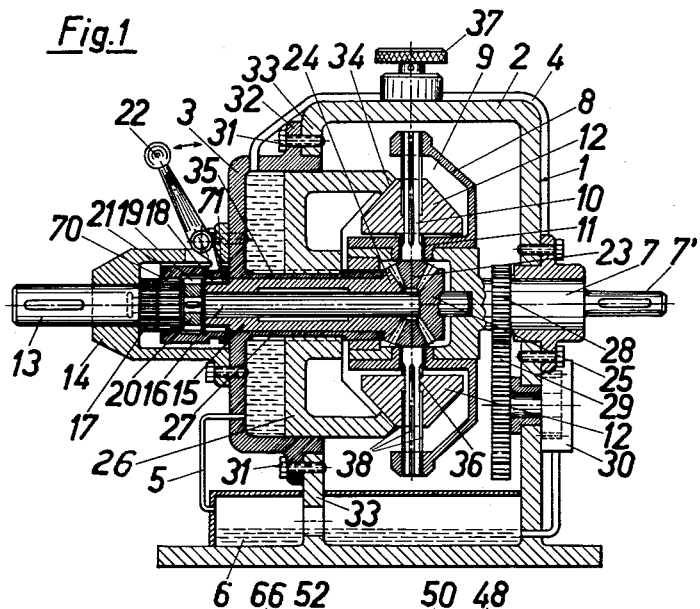
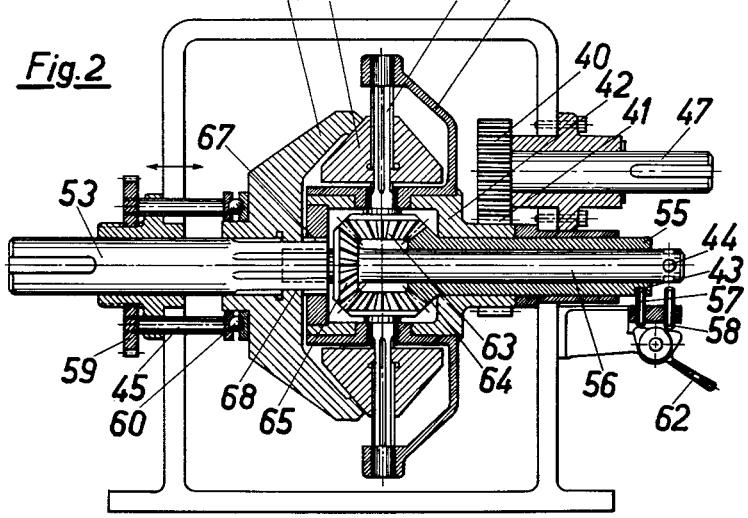
INVENTOR
KARL MAICHEN
BY
ATTORNEY

United States Patent Office 3,023,644
Patented Mar. 6, 1962

3,023,644
INFINITELY VARIABLE FRICTION WHEEL GEAR
Karl Maichen, Lauterach 269, Austria
Filed Aug. 17, 1959, Ser. No. 834,346
5 Claims. (Cl. 74—796)

This invention relates to an infinitely variable friction wheel gear which is simple in construction and suitable for a high step-down ratio and the transmission of high powers.

According to the invention the infinitely variable friction wheel gear comprises input and output parts, the input part comprising cone-shaped solids of revolution urged outwardly by centrifugal force, the axis of rotation of the solids of revolution being at right angles to the gear axis, said solids of revolution being in contact with an annular race and connected to the driven shaft.

According to another feature of the invention the cone-shaped solids of revolution are vertically adjustably mounted on concentric pins and coupled for rotation with these pins, which are mounted in a housing, which is connected to the driving shaft for rotation therewith.

It is another feature of the invention to provide bevel wheels which are in mesh with the driven shaft on those ends of the pins of the cone-shaped solids of revolution which face the driven shaft.

Finally, it is a feature of the invention to provide the driven shaft with two bevel wheels which are diametrically arranged with respect to the bevel wheels on the pins and are adapted to be selectively coupled to the bevel wheels on the pins.

Further features of the invention will be explained with reference to the drawing, in which FIGS. 1 and 2 show two illustrative embodiments of the infinitely variable gear according to the invention in axial longitudinal sectional views.

In the illustrative embodiment shown in FIG. 1, 1 is the gear housing, which consists of two parts 2, 3, which are connected to each other by screws 31. The part 3 consists of an oil pressure cylinder and communicates by the feed conduit 4 and the drain conduit 5 with an oil tank 6. The flow in the two conduits 4 and 5 is controlled by a control valve 37.

In the housing part 2, the driving shaft 7 is mounted, which is connected to a cage 8, in which pear-shaped spaces 9 are provided, which are open toward the output side and may have any desired number but are preferably equally angularly spaced to provide for a balanced system. Each of the spaces 9 contains a pin 10, which extends at right angles to the axis of the driving shaft 7 and which is mounted in an eccentrically bored bush 11 of the cage 8 and carries a cone-shaped solid of revolution 12, which is centrally mounted on the pin 10 for vertical adjustment. The pin and the solid of revolution have interengaging grooves 38 and ribs 36 so that they are coupled for joint rotation. The eccentric bushes 11, which may be disposed at one or both ends of the pin, can be rotated to effect a slight displacement of the pins 10 in the direction of the gear axis whereby an alignment of the pins 10 relative to each other is possible.

The driven shaft 13 is mounted in a flange 14 carried by the housing part 3 and is continued in the gear housing by a hollow shaft 15 and a shaft 16 mounted in said hollow shaft. The driven shaft 13 can be selectively coupled to said two shafts. For this purpose the driven shaft 13 and the hollow shaft 15 have claws 17 and 18, respectively, and the shaft 16 has keyed thereon a disk 20 provided with claws 19. A slidable sleeve 21 provided with mating claws 70, 71 is constantly in mesh with the claws 17 and can be selectively caused to engage the claws 18 or 19 by an adjustment of the lever 22 serving to shift the sleeve.

At the inner ends of the pins 10, bevel wheels 23 are provided, which mesh on the one hand with the bevel wheel 24 of the hollow shaft 15 and on the other hand with the bevel wheel 25 on the shaft 16.

The solids of revolution 12 are in contact with an annular race 26, which is concentric with the gear axis and has a conical surface 34 and is slidably mounted like a plunger in the housing part 3. The race 26 is carried by a hub 27 extending from the housing part 3 and provided with grooves 35 engaged by mating ribs of the annular race 26 so that the same is locked against rotation.

By means of the gear wheels 28, 29 the driving shaft 7 drives an oil feed pump 30, which consists preferably of a gear pump.

The gear according to the invention operates as follows: The driving shaft 7 is driven at its free portion 7′ protruding from the housing by the motor and drives the cage 8, to which it is firmly connected. The rotation of the cage 8 imparts a rotation about the gear axis to the pins 10 and the solids of revolution 12 so that the latter are urged outwardly under the action of the speed of rotation until they are in snug engagement with the surface 34 of the non-rotatable annular race 26. They revolve on this race and transmit their rotation to the pins 10, which drive by means of the bevel wheels 23 the bevel wheels 24, 25 and with them the hollow shaft 15 and the shaft 16. Depending on which of the two last-mentioned shafts 15 and 16 is coupled to the driven shaft 13 the latter is driven in one direction of rotation or the other so that the gear according to the invention is suitable for forward and reverse motion. When the lever 22 is in the position shown the hollow shaft 15 is coupled to the driven shaft 13. When it is desired to couple the driven shaft 13 to the shaft 16 the lever 22 must be swung in the clockwise sense to disengage the claws 71 from the claws 18 and to engage the former with the claws 19. The claws 70 continue to engage the claws 17, which extend throughout the shifting path of the claws 70.

The conduit 5 is also controlled by the valve 37; this is not shown for the sake of clarity. The pump 30 continuously discharges oil. As long as the flow of oil to the housing part 3 equals the discharge of oil from the same into the oil tank 6 the annular race 26 remains in position. When more oil is fed to the part 3 than is discharged from it owing to a corresponding setting of the valve 37 the annular race 26 will be displaced toward the solid of revolution 12 and the bevel wheel 23 so that this conical surface 34 of the race engages the conical solids of revolution on annular zones smaller in diameter. As a result, the solids of revolution 12 rotate at higher speed and the speed of the driven shaft is increased. To reduce the speed of the driven shaft, more oil is discharged from the housing part 3 than is fed thereto. This enables the solids of revolution 12 under the action of the centrifugal force produced by the rotation of the cage 8 to urge the annular race 26 into the housing part 3 so that the surface of the solids of revolution engages the conical surface 34 with annular zones larger in diameter and the solids of revolution 12 rotate at lower speed.

It is obvious that the annular race 26 may also be mechanically shifted, as is described, e.g., in the following illustrative embodiment.

In the illustrative embodiment shown in FIG. 2, the driving shaft 47 is operatively connected by a gear wheel 40 to the gear rim 41 of a driving member 42, which carries the cage 48 with the pins 50 and the cone-shaped solids of revolution 52 slidable thereon. In this embodiment the hollow shaft 55 and the shaft 56 which is mounted in the hollow shaft are mounted independently of the driven shaft 53. The bevel wheels 64, 65 carried by the shafts 55 and 56 mesh with the bevel wheels 63 at the inner ends of the pins 50. The end portions of the hollow shaft 55 and of the shaft 56 are provided each along a peripheral circle with bores 43 and 44, respectively, in which a pin 57 or 58 can be selectively inserted by means of a hand lever 62 in order to lock one shaft or the other against rotation.

The annular race 66 on which the solids of revolution 52 revolve is directly carried by the driven shaft 53, the end of which is formed with grooves 67 engaged by mating ribs 68 formed in the bore of the annular race 66 so that both parts are coupled for joint rotation. The axial adjustment of the annular race 66 is effected by an adjusting nut 59 and thrust pins 45, which bear on the annular race 66 with the bearing 60 interposed.

In the illustrative embodiment shown in FIG. 2 the driving shaft 47 drives by means of the driving member 42 the cage 48, the rotation of which imparts to the pins 50 a rotation about an axis which is at right angles to the axis of the pins 50. As a result, the bevel wheels 63 of the pins revolve on the bevel wheel 64 or 65 held stationary at the time, depending on whether the pin 57 is inserted in the bore 43 or the pin 58 is inserted in the bore 44, whereby the pins 50 are rotated in one sense of rotation or the other. This rotation is transmitted to the annular race 66 by the solids of revolution 52, which are forced against the annular race 66 by centrifugal force, and the annular race 66 drives the driven shaft 53 in one sense of rotation or the other in accordance with the rotation imparted to said race.

It is obvious that in the illustrative embodiment shown in FIG. 2 the adjustment of the annular race 66 may be effected by hydraulic rather than mechanical means. The shafts 55, 56 may be locked by a band brake or other braking means.

What is claimed is:

1. An infinitely variable speed mechanism comprising rotatable input and output shafts, a rotatable cage driven by said input shaft, at least one pin journalled on said cage and extending outwardly with respect to the axis of rotation of said cage, a cone-shaped planetary member slidably disposed on each pin and keyed thereto for rotation therewith, whereby upon rotation of said cage centrifugal force tends to thrust the cone-shaped member outwardly on its pin, an axially movable annular race disposed adjacent said pin and engageable with the conical surface of said cone-shaped member which, when it is revolved by said cage, is revolved on said annular race and thereby rotated, means deriving motion from said pin for driving said output shaft, means for axially moving said annular race to vary the ratio of the diameters of the engaging portions of the cone-shaped member and the race so that the speed of said output shaft may be varied, said cone-shaped member being freely slidable on its pin and having its smaller portion facing outwardly, and said race being disposed outwardly of said cone-shaped member relative to the orbital axis of said member and limiting outward movement of said member on its pins, whereby centrifugal force urges said member toward said race to provide a positive drive therebetween.

2. An infinitely variable speed mechanism comprising rotatable input and output shafts, a rotatable cage driven by said input shaft, two pins journalled on said cage extending radially with respect to the axis of rotation of said cage and disposed 180 degrees apart, a bevel gear connected to the inner end of each pin, a cone-shaped planetary member slidably disposed on each pin and keyed thereto for rotation therewith, whereby upon rotation of said cage the cone shaped members are thrust outwardly on their pins by centrifugal force, a non-rotatable and axially movable annular race disposed adjacent said pins engageable with the conical surface of said cone-shaped members to react against said members as they are revolved by said cage, a forward bevel and a reverse bevel each meshing with both bevel gears, a connecting shaft fixed to each bevel, means for selectively connecting one of said connecting shafts with said output shaft to drive said output shaft in a forward or reverse direction, means for axially moving said annular race to vary the ratio of the diameters of the engaging portions of the cone-shaped members and the race so that the speed of said output shaft may be varied, said cone-shaped members being freely slidable on their pins and having their smaller portions facing outwardly, and said race being disposed outwardly of said cone-shaped members relative to the orbital axis of said members and limiting outward movement of said members on their pins, whereby centrifugal force urges said members toward said race to provide a positive drive therebetween.

3. The mechanism of claim 2 wherein said axially moving means includes a casing defining a cylinder in which the annular race fits and defines a piston, conduits connected to said cylinder for supplying and discharging a pressure medium, and valve means connected to said conduits for controlling the amount of pressure medium in said cylinder.

4. An infinitely variable speed mechanism comprising rotatable input and output shafts, a rotatable cage driven by said input shaft, a plurality of pins journaled on said cage and extending outwardly with respect to the axis of rotation of said cage, a cone-shaped planetary member having its smaller portion facing outwardly slidably disposed on each pin and keyed thereto for rotation therewith, an annular race disposed adjacent said pins and engageable with the conical surfaces of said cone-shaped members, said race being disposed outwardly of said cone-shaped members relative to their orbital axis and limiting outward sliding movement of said members on the pins, the centrifugal force of the rotating cage urging said members toward said race to provide a positive drive connection therebetween, a pair of intermediate shafts, gear means connecting said intermediate shafts to said pins, means locking one of said race or intermediate shafts against rotation, means connecting the unlocked race or intermediate shaft to said output shaft to drive the latter, and means for axially moving said annular race to vary the ratio of the diameters of the engaging portions of the cone-shaped members and the race so that the speed of said output shaft may be varied.

5. The mechanism of claim 4 wherein the cone-shaped surface of each planetary member is formed by straight generating lines.

References Cited in the file of this patent
UNITED STATES PATENTS

| 1,155,435 | Page | Oct. 5, 1915 |
| 1,259,102 | Hutchinson | Mar. 12, 1918 |
| 2,029,042 | Turner | Jan. 28, 1936 |
| 2,836,994 | Weber | June 3, 1958 |

FOREIGN PATENTS

| 1,226,174 | France | Feb. 22, 1960 |